United States Patent
Celere

(10) Patent No.: US 10,793,455 B2
(45) Date of Patent: Oct. 6, 2020

(54) METHOD OF CHLORINATING DRINKING WATER ON A SHIP, IN PARTICULAR A PASSENGER SHIP

(71) Applicant: FINCANTIERI S.p.A., Trieste (IT)

(72) Inventor: Paolo Celere, Trieste (IT)

(73) Assignee: FINCANTIERI S.p.A., Trieste (IT)

(*) Notice: Subject to any disclaimer, the term of this patent is extended or adjusted under 35 U.S.C. 154(b) by 0 days.

(21) Appl. No.: 16/099,647

(22) PCT Filed: May 9, 2017

(86) PCT No.: PCT/IB2017/052685
§ 371 (c)(1),
(2) Date: Nov. 7, 2018

(87) PCT Pub. No.: WO2017/195101
PCT Pub. Date: Nov. 16, 2017

(65) Prior Publication Data
US 2019/0152818 A1 May 23, 2019

(30) Foreign Application Priority Data
May 11, 2016 (IT) .................. 102016000048159

(51) Int. Cl.
*C02F 1/76* (2006.01)
*B63J 1/00* (2006.01)
(Continued)

(52) U.S. Cl.
CPC .............. *C02F 1/76* (2013.01); *B63J 1/00* (2013.01); *C02F 1/008* (2013.01); *C02F 1/006* (2013.01);
(Continued)

(58) Field of Classification Search
None
See application file for complete search history.

(56) References Cited

U.S. PATENT DOCUMENTS 5,958,229 A * 9/1999 Filiopoulos ........ B01D 19/0068
204/278
7,638,064 B1 12/2009 Miller et al.
(Continued)

FOREIGN PATENT DOCUMENTS

FR 2 467 823 A1 4/1981
WO 2010/076558 A2 7/2010

OTHER PUBLICATIONS

International Search Report and Written Opinion of the International Searching Authority for International Patent Application No. PCT/IB2017/052685 dated Sep. 1, 2017, 15 pages.

*Primary Examiner* — Richard C Gurtowski
(74) *Attorney, Agent, or Firm* — Merchant & Gould P.C.

(57) ABSTRACT

A method of chlorinating drinking water on a ship with a production and distribution system includes a recirculation distribution network and device for injecting a chlorine compound generating free chlorine into the network in an injection point. A regimen set point is set for free chlorine concentration at the injection point between 0.4 and 1.2 mg/l. Free chlorine concentration is monitored proximate the injection point by a first probe. Free chlorine concentration at a point furthest from the injection point is monitored by a second probe. The chlorine compound is injected into the distribution network to maintain the free chlorine concentration at the regimen set point. Regimen chlorination is performed if the second probe does not detect free chlorine concentration variations from the regimen set or detects variations in concentration relative to the regimen set point lower than a safety limit and/or duration lower than a safety time limit.

22 Claims, 7 Drawing Sheets

(51) Int. Cl.
*C02F 1/00* (2006.01)
*C02F 103/02* (2006.01)
(52) U.S. Cl.
CPC .... *C02F 2103/02* (2013.01); *C02F 2201/001* (2013.01); *C02F 2209/003* (2013.01); *C02F 2209/006* (2013.01); *C02F 2209/29* (2013.01); *C02F 2209/44* (2013.01); *C02F 2303/04* (2013.01); *C02F 2303/185* (2013.01); *C02F 2307/14* (2013.01)

(56) References Cited

U.S. PATENT DOCUMENTS

2013/0056416 A1* 3/2013 Chen .................. C02F 9/00
210/638
2016/0052797 A1 2/2016 Economedes

* cited by examiner

METHOD OF CHLORINATING DRINKING WATER ON A SHIP, IN PARTICULAR A PASSENGER SHIP

This application is a National Stage Application of PCT/IB2017/052685, filed 9 May 2017, which claims the benefit of Serial No. 102016000048159, filed 11 May 2016 in Italy, and which applications are incorporated herein by reference. To the extent appropriate, a claim of priority is made to each of the above-disclosed applications.

FIELD OF APPLICATION

The present invention relates to a method of chlorinating drinking water on a ship, particularly a passenger ship, and even more specifically a cruise ship.

The present invention also relates to a production and distribution system of drinking water on board a ship, in particular a passenger ship.

STATE OF THE ART

The production and distribution system of drinking water on board a ship, particularly a large passenger ship, is a complex system, divided into subsystems and comprises production devices, water purification devices and filtration devices.

This system is normally fed by an evaporator-distiller system and/or a reverse osmosis-distiller system and/or a bunkering system, the potential of which varies from 30 t/day for a cargo vessel up to 500 t/day for a passenger ship of 100000 GRT (gross registered tonnage). The drinking water thus produced is used for different services and for this reason is piped toward various circuits, forming an exceptionally extensive distribution network. Among these services are: uses for food, bathroom facilities, washing, recreational (swimming pools), catering and hotel services.

In general, as shown in the simplified diagram in FIG. 1, a production and distribution system of drinking water in a passenger ship comprises:—a plurality of water storage tanks 1, structurally separate from the double bottom and contaminant areas; water chlorination and filtration apparatus 5; withdrawing/boost/recirculation pumps 3, 14;—heaters and coolers 7, 16, 17;—control valves/non-return valves 2, 6, 13, 15;—a control room 30;—main manifolds, generally made of stainless steel, which form the main distribution circuit and constitute the distribution loops on the decks of the ship;—secondary manifolds, made of plastic or steel, which distribute water from the main manifolds towards passenger users in the cabin and the users of restaurants and public areas.

Depending on the temperature of the water in the distribution network two circuits can be identified: a cold drinking water circuit (reference numerals 1 to 13) and a hot drinking water circuit (reference numerals 14 to 21).

Reference numerals 1 to 9 identify the branch of the network constituted by the main manifold bringing water from the drinking water storage tanks to the loops on decks P1 supplying passengers and toward the loops on decks P2 supplying service users, restaurants and public areas; reference numerals 10 to 12 indicate the recirculation manifolds of cold drinking water from the decks; reference numerals 13, 18 and 19 identify the supply manifolds of hot drinking water; 20 and 21 indicate the recirculation manifolds of hot drinking water from the decks.

The chlorination apparatus and detection points of the concentration of chlorine in the distribution network are of particular importance for the purposes of drinking water.

There are generally two chlorine concentration detection points. A first detection point is placed in the vicinity of the chlorination device and is called the Injection Point (IP). Detection at the injection point is performed using a detection probe 4 of the concentration of free chlorine. A second detection point is situated in the branch of the network furthest from the injection point and is called the Far Point (FP). This second point consists of a water sampling well 12 for the measurement of the concentration of free chlorine.

In ships, and in particular in passenger ships, it is imperative to ensure that the wide distribution network of drinking water is kept free of microorganisms, which, encountering a particularly favourable environment for their development, could create colonies that are difficult to eradicate as well as dangerous to man. These microorganisms may consist of yeasts, moulds, bacteria or pathogenic germs.

In order to ensure the asepticity of the networks, international regulations provide for the use of disinfectant products, normally but not necessarily chlorine-based. The effective fraction of chlorine, i.e. Free Residual Chlorine, which is present as free chlorine $Cl_2$ or dissolved in the dual form of hypochlorous acid $HOCl$ and/or disassociated in ionic form as hypochlorite—$OCl$, is monitored continuously at the injection point using the aforesaid probe 4. The concentration at the far point is checked daily by taking a sample from the dedicated well 12.

The maintenance of the chlorine concentration value, needed to keep the network free of microorganisms, is ensured by an injection device that adjusts the value at the injection point to a predetermined value (set-point), modulating the injection depending on the physiological flow variation determined by changing water demands in the network. This scheme is illustrated in FIG. 2, where it can be observed in particular that the free chlorine concentration value at the of injection point is let to vary within a fluctuation band (±DIF), providing for the injection of chlorine in the case of falling below the band or of a neutralizing agent in the event of an increasing above such band.

Sodium hypochlorite is a liquid and transparent antimicrobial compound, used in drinking water systems both for the disinfection of distribution systems, tanks and equipment, and for the purification of water when distributed to the users, if greatly diluted. Commercial chlorinated sodium hypochlorite solutions have a percentage between 12 and 14% by volume, equal to about 10% by weight of active chlorine (normal bleach contains 5%).

The UNI EN 805 Regulation "Requirements for Water Supply Systems", applicable to urban distribution networks, includes sodium hypochlorite among the disinfection chemicals for water distribution systems with a maximum concentration of 50 mg/l. The use of such a high concentration, well beyond that of potability limit, can only take place under strict supervision for a limited time in order to implement Shock disinfection of the pipelines and of distribution network components. Under normal conditions, the drinking water leaving the sanitized equipment should have a maximum residual chlorine concentration of 0.2 mg/l (ppm).

In the naval context, given the high density human population, particularly on cruise ships, more stringent criteria are used to control the proliferation potential of microorganisms by applying a regulation providing for free chlorine levels in the distribution network higher on the average than those allowed in urban networks.

With regard to the purification of water in the naval sector, the American Federal regulation UPSHS (United States Public Health Service), nearly taken as an international reference for ship conduction, is now universally applied.

With the exception of drinking water storage tanks, where free chlorine values should be higher than 2 mg/l, the USPHS health regulation requires that in the rest of the distribution network a minimum value of at least 0.2 mg/l or ppm in the Far Point is guaranteed and in order to achieve this level a maximum concentration of 5 ppm detectable at the injection point is allowed. American health regulation USPHS stipulates that water loaded in the drinking water storage tanks be sterilized with chlorine concentrations between 2.0 and 5.0 ppm. More specifically, such regulation provides that the free chlorine concentration is raised to at least 2 ppm within 30 minutes of beginning storage in the tank.

For purification of water, the concentration of sodium hypochlorite at the injection point (taking into account commercial dilution) is generally set at around 2 mg/l (2 ppm). It should be considered that the solutions naturally lose the active chlorine titre in reducing the bacterial load and that therefore concentrations above the threshold of 0.2 mg/l must be used to ensure that at any point in the network values are not lower than this threshold.

The choice of the value to be attributed at the Set Point, within the broad range provided for by the regulation, is usually made on the basis of direct observations of the circuit response but, above all, on the basis of empirical considerations concerning the drop in the concentration of free chlorine in the distribution network between the Injection point (IP) and the Far Point (FP). The graph in FIG. 5 shows the trend of the free chlorine concentration drop as a function of the distance between the injection point IP and far-point FP and of the starting concentration (at the IP).

The decision regarding the value to be maintained at the injection point IP of the chlorine must be such as to ensure the required safety margin so that at the furthest point FP it never falls below the minimum value provided for of 0.2 ppm, taking into account the drop in concentration that takes place along the line. It is on this margin that the subjective element comes into play, represented by the considerations of the Chief Engineer, the Hotel Manager or the Shipping company itself, developed on the basis of empirical observations, on what concentration level can guarantee such margin.

Inputting the Set Point value, as well as its variation according to the circuit response, which may lead to higher drops in chlorine in the case of contamination of the circuit by organic material, is always carried out manually by on-board crew acting directly on the chlorination equipment. Generally, the on-board procedure stipulates that a member of the crew should take a water sample at the Far Point FP daily and estimate the free chlorine concentration level using colorimetric measurement methods.

Since the penalty imposed by government control bodies for falling below the minimum value of 0.2 ppm is exceptionally high, the margin never seems sufficient. For this reason, for operating personnel, the operating regime has reached values around 2.0 ppm, raising it to an order of magnitude higher than the minimum value to be guaranteed of 0.2 ppm. The maintenance of this level requires the introduction of very high doses of chlorine.

Leaving aside the chlorination systems of the swimming pools, which must satisfy different regulatory requirements, the water purification systems are therefore not managed automatically by means of control systems based on feedback of the level of chlorine drop between the injection point and the far-point. To date, chlorination systems on board ship are not adjusted based on the concentration value detected by the probe at the Far Point (FP) and therefore do not provide for continuous monitoring. In fact, the extreme variability of the demand for drinking water in the network, resulting in continuously different times in the flow between the chlorination equipment and Far Point FP, de facto prevents the use of chlorine injection according to a feedback adjustment logic of the value of free chlorine detected at the Far Point FP.

In the state of the art, the control systems for drinking water systems in passenger ships therefore only acquire the incoming data from the probe located at the injection point and during the operation of the plant do not take into account the values at the Far Point. Only one injection of sodium hypochlorite (at the injection point) is provided for, sufficient to maintain the level of 1.5 ppm÷2.0 ppm at the injection point.

The use of chlorine at such high concentrations in continuous operation has very damaging effects on the distribution network. In the medium to long term, these concentration values are incompatible with many of the materials used for the construction of the circuit, leading to extensive corrosion phenomena. Corrosion and the consequent perforation of the water supply pipes cause flooding damage and disruption to the drinking water supply in the cabins, equipment rooms and public areas, as well as costs for operations to restore the service.

Aside from the systematic costs generated by the consumption of the product, the use of chlorine at the current concentrations thus results in significant economic costs caused by damage to the distribution network.

In the scope of water purification on board ship, there is therefore a need to eliminate or at least reduce the incidence of corrosion phenomena in the drinking water distribution networks on board, while still ensuring the asepticity of said networks, in full compliance with the relevant regulation.

PRESENTATION OF THE INVENTION

Consequently, object of the present invention is to eliminate or at least mitigate the drawbacks of the prior art mentioned above by providing a method of chlorinating drinking water on a ship, in particular a passenger ship, which allows to eliminate or at least reduce the incidence of corrosion phenomena in the distribution network, while continuing to ensure the asepticity of the network itself.

A further object of the present invention is to provide a method of chlorinating drinking water on a ship, in particular a passenger ship, which is easy to implement and manage in a fully automated manner.

A further object of the present invention is to provide a method of chlorinating drinking water on a ship, in particular a passenger ship, which can be implemented without requiring a complex automatic control system.

A further object of the present invention is to provide a system for the production and distribution of drinking water on board a ship, which allows automatic control of the chlorination of water according to a logic of reducing the incidence of corrosive phenomena and at the same of preserving the aseptic conditions of the distribution network.

BRIEF DESCRIPTION OF THE DRAWINGS

The technical features of the invention, according to the aforesaid aims, can be seen clearly from the content of the following claims and the advantages thereof will become more readily apparent in the detailed description which follows, made with reference to the appended drawings, illustrating one or more embodiments by way of non-limiting examples, wherein:

DETAILED DESCRIPTION

The present invention relates to a method of chlorinating drinking water on a ship, particularly a passenger ship, and even more specifically a cruise ship.

Figure 3:
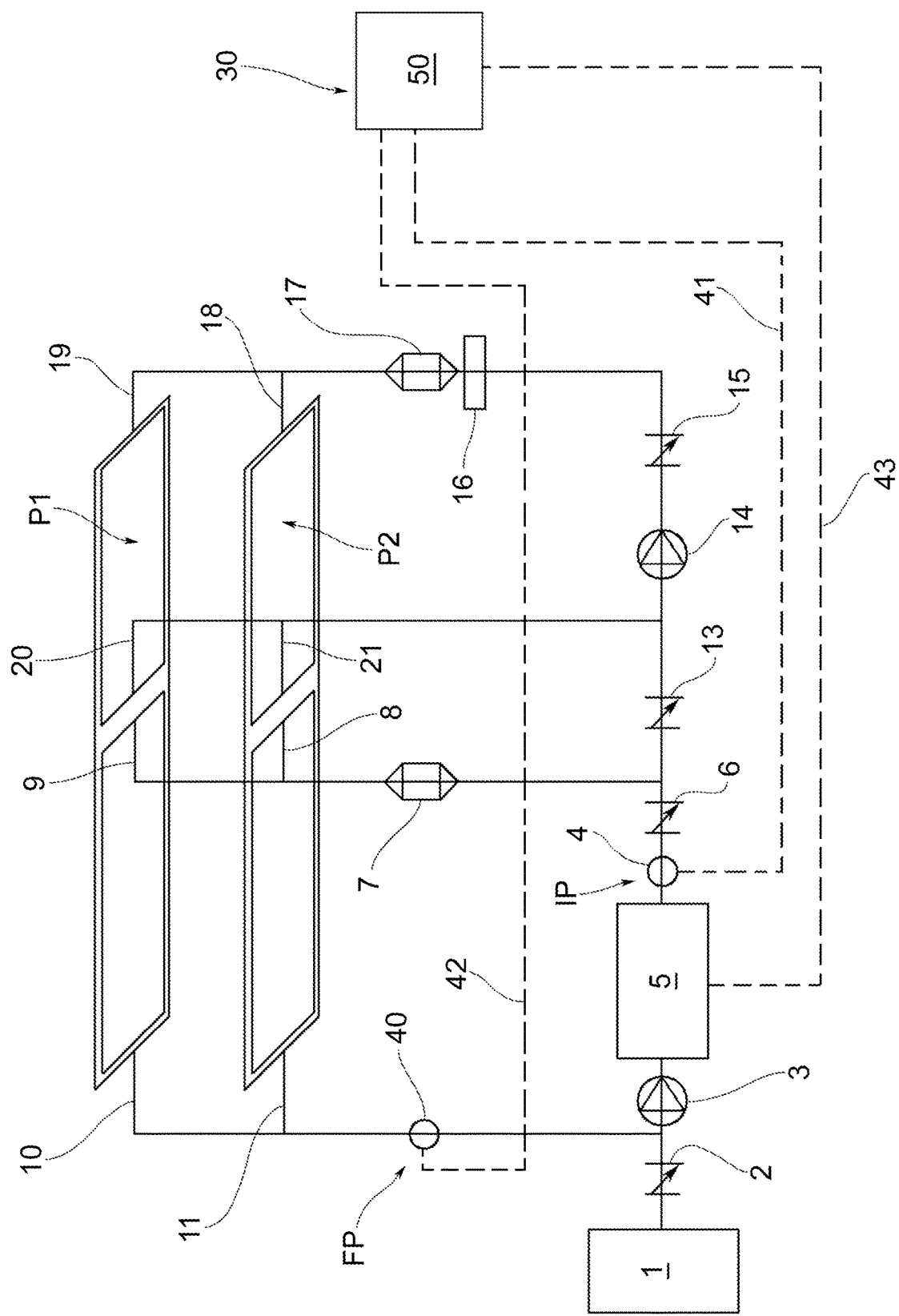
FIG. 3 shows a simplified functional scheme of a water purification system for a passenger ship structured to implement the chlorinating method according to the present invention.

As illustrated in FIG. 3, the chlorinating method according to the invention is implemented on a ship, and in particular a passenger ship, equipped with a drinking water production and distribution system which in turn comprises:
    a recirculation distribution network; and
    a device for injecting at a predetermined injection point IP in the distribution network at least one chlorine compound capable of generating free chlorine in the water.

The term "chlorine compound capable of generating free chlorine active in water" means, in particular, the following compounds: sodium hypochlorite (NaClO); chlorine dioxide ($ClO_2$) or directly chlorine gas ($Cl_2$).

The term "free chlorine" means generally the product of the reactions in water of the above chlorine compounds: free chlorine ($Cl_2$), hypochlorous acid (HOCl) and hypochlorite ion (—OCl).

According to a general embodiment of the invention, as in the solutions of the prior art, the method of chlorinating drinking water comprises a chlorination step a), in which said at least one chlorine compound is injected into circulation at the predetermined injection point IP to keep the distribution network aseptic by releasing free chlorine into circulation.

As already pointed out, the distribution network is a recirculation network. This makes it possible to avoid a natural drop in the titre of free chlorine due to the stagnation of drinking water in the more remote endings of the circuit.

In particular, as illustrated in FIG. 3, the drinking water production and distribution system comprises drinking water storage tanks 1, fluidically connected to the recirculation distribution network via non-return valves 2. The recirculation distribution network is thus supplied with drinking water taken from the drinking water storage tanks 1.

According to a first essential aspect of the present invention, the chlorinating method comprises the following operating steps:
    a step b) of fixing a regimen set point SET1 for the concentration of free chlorine at the injection point IP, comprised between 0.4 and 1.2 mg/l; and
    a step c) of monitoring the concentration of free chlorine at or near the injection point IP by means of at least a first detection probe 4 positioned therein;
    a step d) of continuously monitoring the concentration of free chlorine at the furthest point or Far point FP of the distribution network from the injection point IP by means of at least a second detection probe (40) positioned therein.

Unlike the current chlorinating methods, the chlorination method according to the invention is based on continuous monitoring of the concentration of free chlorine not just at the injection point IP, but also at the Far-Point FP.

Anticipating what will be described below, the chlorinating method according to the invention comprises a regulation of the concentration of free chlorine at the injection point depending on the concentration of free chlorine detected at the Far-Point FP. In other words this is a feedback regulation.

According to a further essential aspect of the present invention, the injection step a) comprises a sub-step a1) of regimen chlorination in which the injection of the chlorine compound into the distribution network is conducted so as to maintain the free chlorine concentration in the distribution network at the injection point IP at said SET1 regimen set point.

According to the invention, said sub-step a1) of regimen chlorination is carried out:
    if the second probe 40 (i.e. the Far-Point FP detection probe) does not detect any variations of the free chlorine concentration at the furthest point or Far-point FP with respect to the regimen set point SET1; or
    if the second probe 40 detects concentration variations with respect to said regimen setpoint SET1 having entity lower than a pre-determined safety limit Diff1 and/or duration lower than a predetermined safety time limit Δt1.

In other words, the chlorinating method according to the invention envisages maintaining stable over time a chlorine level (concentration of free chlorine) at the injection point much lower than the chlorination levels envisaged by the prior art, in the case in which substantially the same level of chlorination (concentration of free chlorine) is also detected at the Far-Point FP, i.e. without variations or with transient variations that fall within pre-determined safety values in terms of the entity of the variation and/or the duration of said variation.

The chlorinating method according to the invention is based, in fact, on the observation that there is a significant difference between the exposure times to free chlorine needed to eliminate microbial colonies (including pathogenic germs) and those needed to produce damage to the stainless steel protective layer or in general to the materials forming the components of the drinking water distribution network on a ship, resulting in the inevitable triggering of corrosion.

Chlorination levels comprised between 0.4 mg/l and 1.2 mg/l are in themselves sufficient to ensure the asepticity of the entire water distribution network without, however, producing important chemical reactions of the free chlorine on the materials of the circuit.

Figure 5:
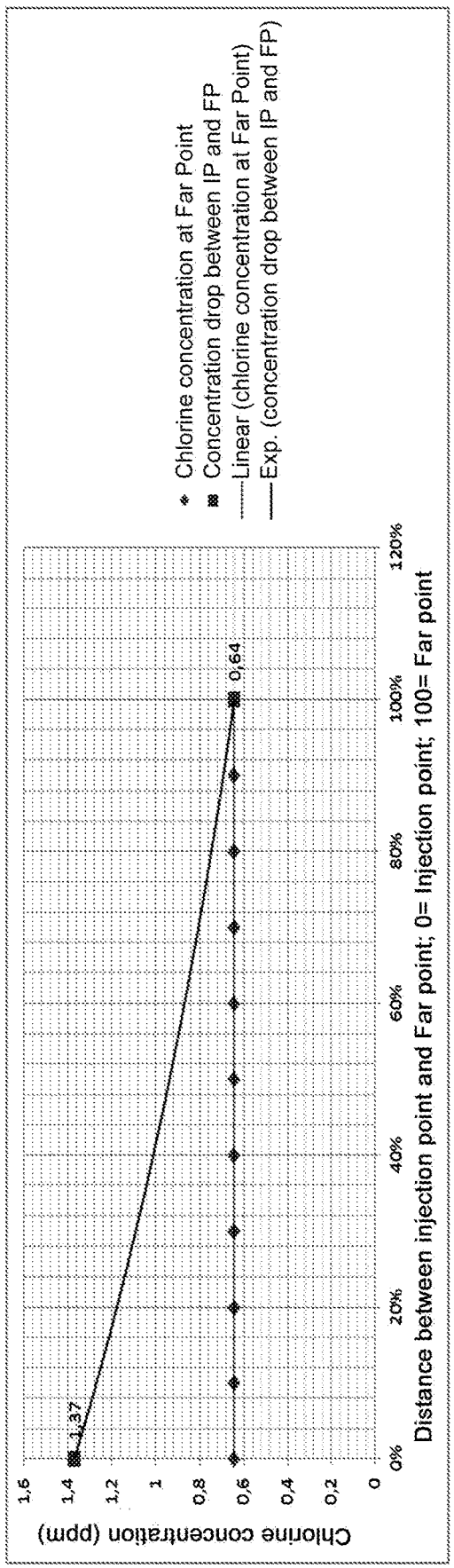
FIG. 5 shows the graph of the trend—at operating conditions—of the concentration of free chlorine as a function of the distance between the injection point IP and far-point FP compared to the concentration of free chlorine detected at the Far point in a water purification system of a ship managed according to the prior art.
Figure 6:
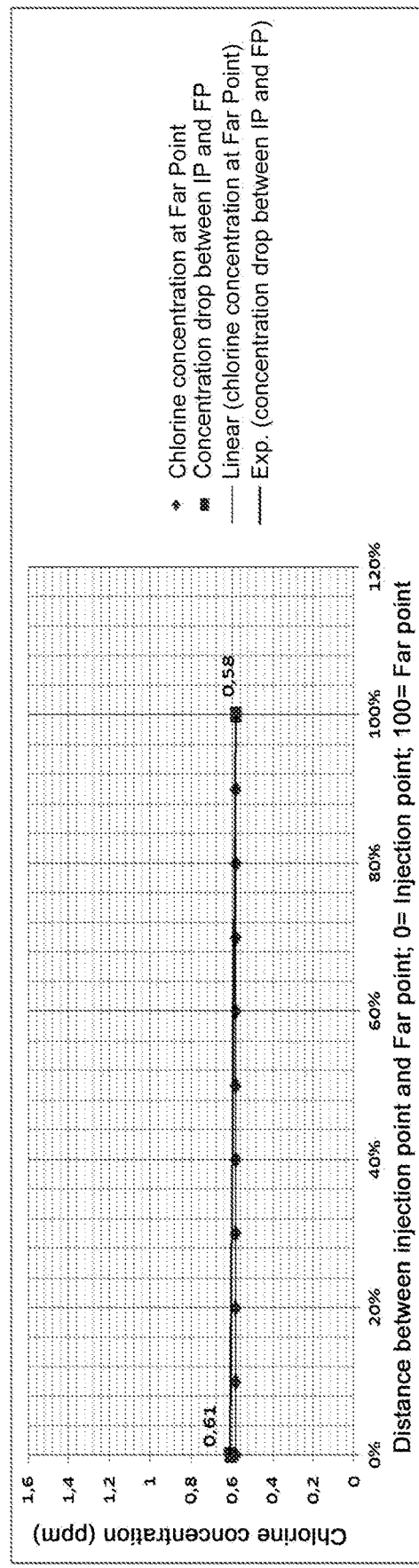
FIG. 6 shows the graph of the trend—under operating conditions—of the concentration of free chlorine as a function of the distance between the injection point IP and far-point FP compared to the concentration of free chlorine detected at the Far point in a water purification system of a ship managed according to the chlorinating method of the present invention.

This phenomenon can be appreciated by comparing the graphs in FIG. 5 with the graphs in FIG. 6 (obtained from a series of recordings actually made on board a cruise ship). In the graph in FIG. 5 (chlorination according to the prior art) it can be seen that chlorinating so as to have a concentration of free chlorine at the injection point of 1.37 mg/l, despite the absence of contamination along the network (at the far point the concentration is stabilised at about 0.64 mg/l), there is a consumption of free chlorine from 1.37 mg/l to 0.64 mg/l. Diversely, in the graph in FIG. 6 (chlorination according to the invention) it can be seen that (under the same conditions of absence of contamination along the network: at the far point the concentration is stabilized at about 0.60 mg/l) the consumption of free chlorine is almost null. In fact, it passes from 0.61 at the injection point to 0.58 mg/l at the far point. The consumption of free chlorine between the injection point and the far-point is therefore attributable to the reactions of chlorine with the components (steel or plastic) of the distribution network.

Figure 7:
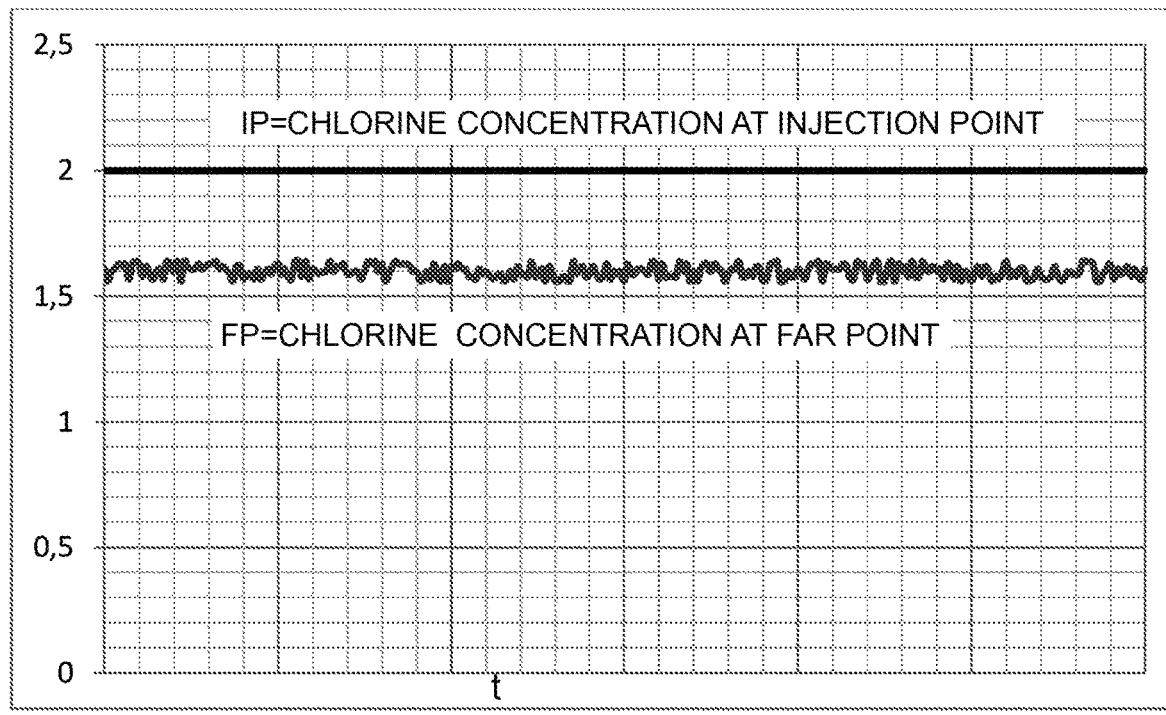
FIG. 7 shows the graph of the time-trend—under operating conditions—of the concentration of free chlorine at the injection point PI and at the far-point FP in a water purification system of a ship managed according to the prior art.
Figure 8:
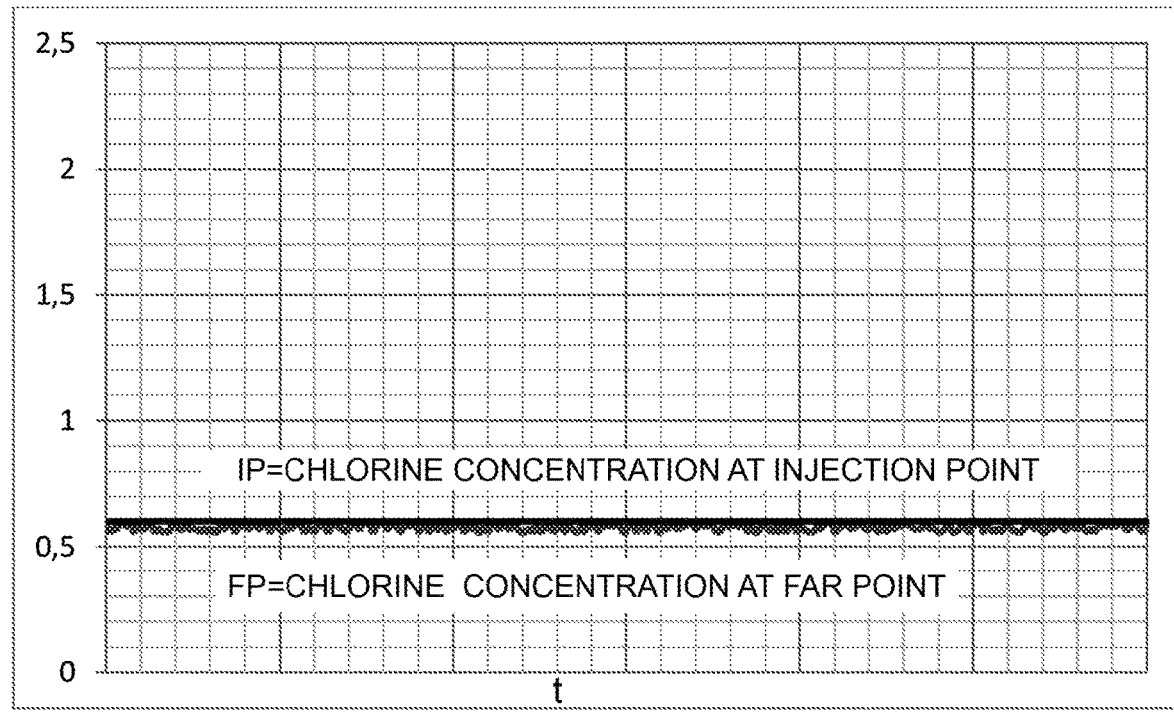
FIG. 8 shows the graph of the time-trend—under operating conditions—of the concentration of free chlorine at the injection point PI and at the far-point FP in a water purification system of a ship managed according to the chlorinating method of the present invention.

Similar considerations may be made comparing the graphs in FIG. 7 with the graphs in FIG. 8, showing—in regimen condition (absence of contamination)—the time trend of the concentration of free chlorine at the injection point IP and at the far-point FP, respectively, in a water purification system of a ship managed according to the prior art and in a water purification system of a ship managed according to the chlorinating method according to the present invention.

At concentrations of free chlorine comprised between 0.4 mg/l and 1.2 mg/l the free chlorine mantains all its chemical reactivity towards biological material, thus ensuring the asepticity of the distribution network. In the absence of biological material in the distribution network (i.e. in the absence of biological contamination), with such chlorination levels the concentration of free chlorine remains stable over time, since the consumption of free chlorine due to reactions with circuit materials (stainless steel, metals, plastics) is either completely absent (for concentration values close to the minimum of 0.4 mg/l) or in any case slowed down significantly (for concentrations close to the maximum of 1.2 mg/l), so much so as to make a negligible contribution to the drop in concentration in the short and medium term.

For these reasons, the detection of free chlorine consumption (detectable by a decrease in concentration from the injection point IP to the Far-point FP) is indicative of the presence of biological material at some point in the circuit. In terms of control, this operational situation can therefore be exploited as a triggering condition for a temporary increase of the chlorination level, aimed at making the water circulating in the distribution network safe.

As already pointed out, the distribution network is a recirculation network. This makes it possible to avoid a natural drop in the titre of free chlorine due to the stagnation of drinking water in the more remote endings of the circuit.

In addition, the recirculation distribution network is then supplied with drinking water taken from the drinking water storage tanks. The drinking water stored in the storage tanks has free chlorine concentrations such as to prevent the presence of any microbial load. As already mentioned above, American health regulation USPHS stipulates that water loaded in the storage tanks should be sterilized with chlorine concentrations between 2.0 and 5.0 ppm. Specifically, such regulation provides that the free chlorine concentration is raised to at least 2 ppm within 30 minutes of beginning storage in the tank. Virtually no microbial load is able to withstand such oxidative potential. As a result, the water drawn from the storage tanks and placed in circulation, having no microbial load (biological material), cannot consume chlorine by direct action on the organic carbon of the biological material.

Thanks to the invention it is therefore possible to eliminate or at least significantly reduce the incidence of corrosion phenomena in the distribution network while continuing to ensure the asepticity of the network itself.

Advantageously, the chlorinating method according to the invention can be conducted automatically by means of an electronic control unit 50. As will be clarified in the description below, thanks to the invention it is possible to implement a fully automatic chlorination control system, effectively relieving the crew from subjective assessments on the drop of free chlorine circulating and the level required to maintain it.

The aforementioned regimen set point SET1 for the concentration of free chlorine at the injection point IP is chosen in a range with a minimum value of 0.4 mg/l and not of 0.2 mg/l, although theoretically even with a concentration of free chlorine of 0.2 mg/l asepticity can be guaranteed. The choice of a minimum operating value of 0.4 mg/l instead of 0.2 mg/l is functional to making the system controllable and to offering a safety margin to the system in the event of contamination by biological material, with respect to the 0.2 mg/l limit imposed by regulation. Indeed, in the case (ruled out) in which the regimen set point were fixed at 0.2 mg/l, there would be no safety margin and the sub-step a1) of regimen chlorination would need to be interrupted every time the second probe 40 detected drops (even minimal) in concentration between the injection point IP and Far-point FP, forcing the system to raise the level of chlorination for the slightest variation. In the case of a set point fixed at 0.2 mg/l the corrosion phenomena in the distribution network would be eliminated, but it would not be possible to guarantee the asepticity of said network. The control of the system would in addition be extremely difficult, generating operating fluctuatios such as to cancel the benefits.

As previously stated, with concentrations of free chlorine comprised between 0.4 and 1.2 mg/l, the consumption of free chlorine due to reactions with the circuit materials (stainless steel, metal, plastic) is completely absent or very low at concentration values in the lower part of the range (i.e. values close to the minimum of 0.4 mg/l) and is still slowed down in an extremely significant manner at concentration values in the higher part of the range (i.e. values close to the maximum of 1.2 mg/l).

Preferably, in order to get the most benefit from the invention in terms of reducing corrosion, the aforesaid regimen set point SET1 of the concentration of free chlorine at the injection point IP is chosen in a range as far as possible from the upper limit of 1.2 mg/l. Preferably, the aforesaid regimen set point SET1 is chosen in the range between 0.4 and 1 mg/l, and even more preferably in the range between 0.4 and 0.8 mg/l. A most preferred value for the regimen set point SET1 is about 0.6 mg/l.

A regimen set point SET1 chosen in the preferred concentration ranges ensures a substantial absence or in any case a highly significant reduction of corrosion phenomena and at the same time a good safety margin and possibility of intervention in the event of contamination of biological origin.

As mentioned earlier, the sub-step a1) of regimen chlorination (i.e. maintaining "low" levels of chlorination, i.e. concentrations between 0.4-1.2 mg/l) is performed:

(A) if the second probe 40 (i.e. the Far-Point FP detection probe) does not detect any variations of the free chlorine concentration at the Far-point FP with respect to the regimen set point SET1; or (B) if the second probe 40 detects concentration variations with respect to said regimen setpoint SET1 having entity lower than a pre-determined safety limit Diff1 and/or duration lower than a predetermined safety limit time $\Delta t1$.

Advantageously, the operating condition (B) is envisaged so as to make the system as independent as possible of false alarms, generated by transient variations in concentrations related, for example, to variations in the flow regimen in the distribution network or from physiological fluctuations of the concentration of free chlorine along the distribution network due, for example, to variations in drinking water demand by the users.

Preferably, the operating condition (B) is defined as the detection of concentration variations with respect to said regimen set-point SET1 having entity lower than a predetermined safety limit Diff1 and/or duration lower than a predetermined safety limit time $\Delta t1$.

In particular, the operating condition (B) lapses in the case that the entity of the variation is higher than the aforementioned safety limit Diff1 or the duration of the variation is higher than the aforementioned safety limit time $\Delta t1$.

Alternatively, it maybe envisaged that the operating condition (B) is missing in the case in which there is a variation having entity equal to or greater than the aforementioned safety limit Diff1 for a period of time with a duration equal to or greater than the aforementioned safety limit time $\Delta t1$.

Preferably, the aforementioned safety limit Diff1 of variation of the concentration at the furthest point or Far-point FP is not higher than 0.2 mg/l. Even more preferably, the aforementioned safety limit Diff1 is about 0.1 mg/l.

Preferably, the aforementioned safety limit time $\Delta t1$ of duration of the concentration at the furthest point or Far-point FP is chosen in the range comprised between 30 minutes and 2 hours. Even more preferably the aforementioned safety time limit $\Delta t1$ is chosen in the range between 30 minutes and 1 hour.

Preferably, the higher the regimen set-point is chosen within the general range of 0.4-1.2 mg/l, the higher the safety limit time $\Delta t1$ can be chosen, a broader safety margin for intervention being available.

According to a preferred embodiment of the invention, the injection step a) comprises a sub-step a2) of transient hyper-chlorination in which the injection of the chlorine compound in the distribution network is conducted so as to temporarily raise the concentration of free chlorine in the distribution network at the injection point IP to a predetermined hyper-chlorination set point SET2 corresponding to a concentration of free chlorine greater than 1.2 mg/l.

In general, said sub-step a2) of transient hyper-chlorination can be performed if the second probe 40 detects variations in concentration of free chlorine at the furthest point FP with respect to the regimen set point SET1 having entity higher than the aforesaid predetermined safety limit Diff1 and/or duration higher than the aforesaid predetermined safety limit time $\Delta t1$.

Advantageously, the fact of conditioning the beginning of the sub-step a2) of hyper-chlorination to the detection of variations in concentration at the Far Point having entity higher than the aforesaid safety limit Diff1 and/or duration higher than the aforesaid predetermined safety limit time $\Delta t1$ allows to make the system as independent as possible of false alarms generated by transient variations in concentrations related, for example, to variations in the flow regimen in the distribution network or by physiological fluctuations of the concentration of free chlorine along the distribution network due, for example, to variations in drinking water demand by the users.

Operatively, the temporary increase in the concentration of free chlorine to a value greater than 1.2 mg/l (hyper-chlorination) is aimed at the destruction of any biological material present in the distribution network and which may have determined the drop in the concentration of free chlorine along the distribution network during the sub-step a1) of regimen chlorination.

Advantageously, the set point value of hyper-chlorination SET2 can also be modulated as a function of the duration of hyper-chlorination, i.e. the intensity of the hyper-chlorination intervention to be performed.

Preferably, the hyper-chlorination set point SET2 is set at a concentration value of free chlorine not higher than 5.0 mg/l.

According to an entirely preferred embodiment, the hyper-chlorination set point SET2 is set at a concentration value of free chlorine of between 2.0 and 3.0 mg/ml and preferably 2.5 mg/l. With such hyper-chlorination values it is possible to limit the duration of hyper-chlorination to a few hours, achieving on the one hand an effective destruction of biological material, and at the same time limiting the inevitable corrosive effects on the components of the water distribution network.

Advantageously, the aforesaid sub-step a2) of transient hyper-chlorination is continued for a predetermined time period of transient hyper-chlorination $\Delta t2$.

In particular, the aforementioned time period of transient hyper-chlorination $\Delta t2$ is set as a function of the extension of the distribution network to ensure that the hyper-chlorination interests the entire network.

Preferably, the choice of the time period of transient hyper-chlorination $\Delta t2$ is made independently of assessments of the regimen flow in the distribution network. The extreme variability of the regimen flow in the network in fact makes any detections on the water flows in the network non-utilisable for the purposes of the present invention.

Preferably, the aforesaid time period of transient hyper-chlorination $\Delta t2$ has a duration chosen in the range comprised between 2 and 12 hours, preferably between 2 and 6 hours.

Advantageously, at the end of the aforesaid sub-step a2) of transient hyper-chlorination, the method comprises a step e) of stabilization of the concentration of free chlorine in which the concentration of free chlorine at the injection point IP is made to decrease from the hyper-chlorination set point SET2 up to reach the regimen set point SET1.

At the end of the aforesaid stabilization step e), the sub-step a1) of regimen chlorination is performed or the sub-step a2) of transient hyper-chlorination is repeated depending on whether or not a concentration of free chlorine substantially corresponding to the set point regimen value SET1 is detected at the Far point FP, i.e. depending on whether or not the concentration of free chlorine has also stabilized at the Far point FP to the value corresponding to the regimen set point SET1. "Stabilization" is taken to mean the occurrence of a situation defined in the conditions (A) or (B) already defined above.

According to the preferred embodiment of the invention, in the stabilization step e) the injection of chlorine compound is stopped and a chemical reducing agent is injected to neutralize the free chlorine so as to accelerate the achievement of the set-point regimen value SET1. In particular, Sodium Metabisulphite (E223) can be used as the reducing substance.

Alternatively, in the stabilisation step e) the injection of the chlorine compound is stopped and the free chlorine concentration is let to fall to the regimen set-point value SET1 without intervention.

Figure 9:
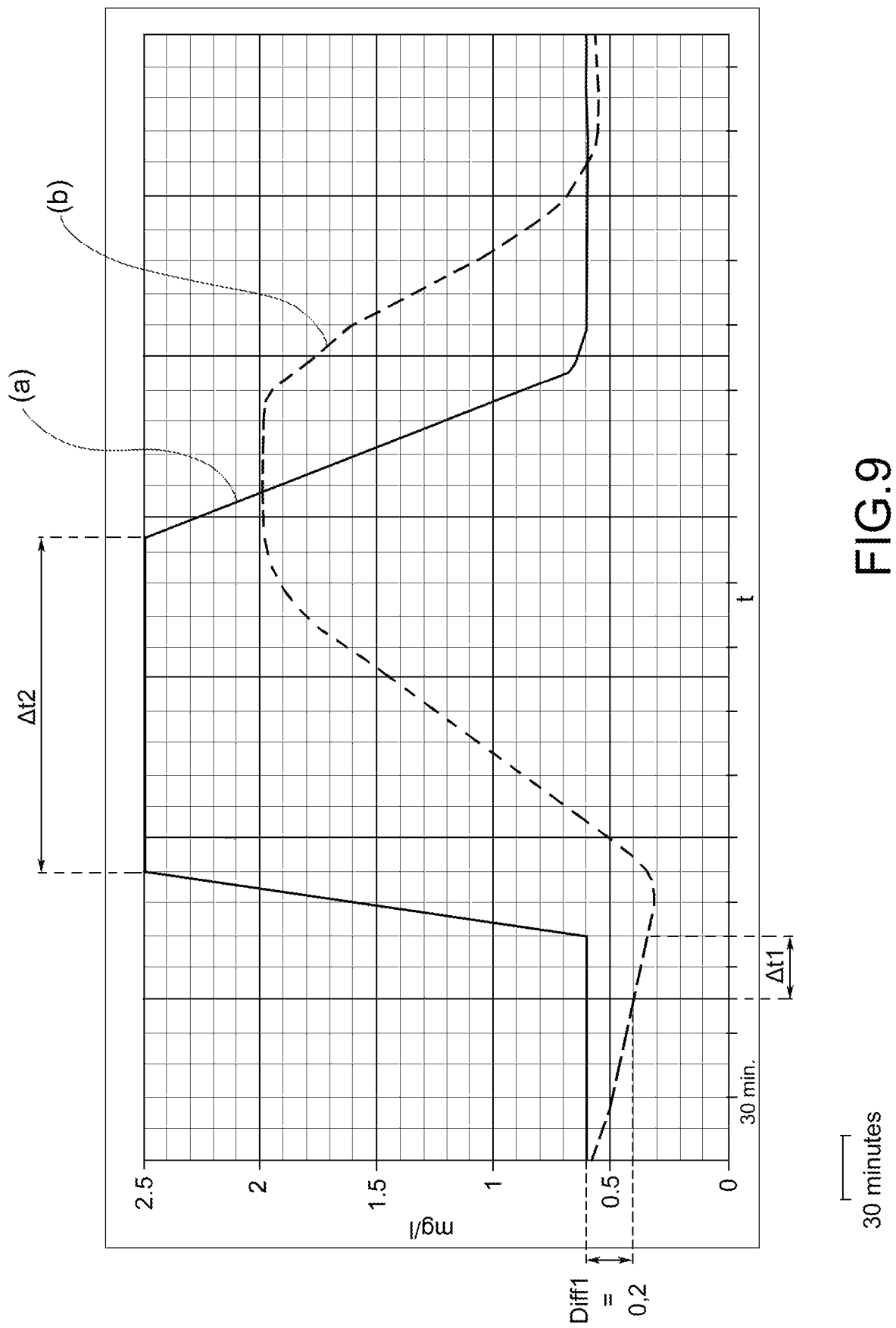
FIG. 9 shows the graph of the time-trend of the concentration of free chlorine at the injection point PI and at the far-point FP in a water purification system of a ship managed according to the chlorinating method of the present invention in a transitory situation corresponding to the system response to detection of a risk of contamination.

FIG. 9 shows the time trend of the concentration of free chlorine at the injection point IP (curve a) and at the far-point FP (curve b) in an operating situation of transition from a sub-step a1) of regimen chlorination to a sub-step a2) of transient hyper-chlorination. In the example shown in FIG. 9, the regimen set point is set at 0.6 mg/l; the safety limit Diff1 at 0.2 mg/l; the safety limit time Δt1 at 30 minutes; the hyper-chlorination set point SET2 at 2.5 mg/l; the duration of transient hyper-chlorination Δt2 at approximately 2 hours and 30 minutes. The following is observed:
- a physiological time delay of response of the curve b with respect to the curve a, related to the distribution time of the free chlorine in the distribution network;
- a difference in concentration between the maximum concentrations in curve a and curve b.

The concentration difference is attributable to the consumption of free chlorine related to the destruction of biological material (desired effect of hyper-chlorination) and corrosive attack against the components of the distribution network (side effect of hyper-chlorination).

On the right side of the two graphs, one can also observe that at the end of the transient hyper-chlorination sub-step a2), the stabilization step e) starts. In turn this stabilization step e) ends with a new sub-step a1) of regimen chlorination, after a stabilization of the concentration of free chlorine at the Far point to values substantially corresponding to the regimen set point value at the injection point.

Figure 4:
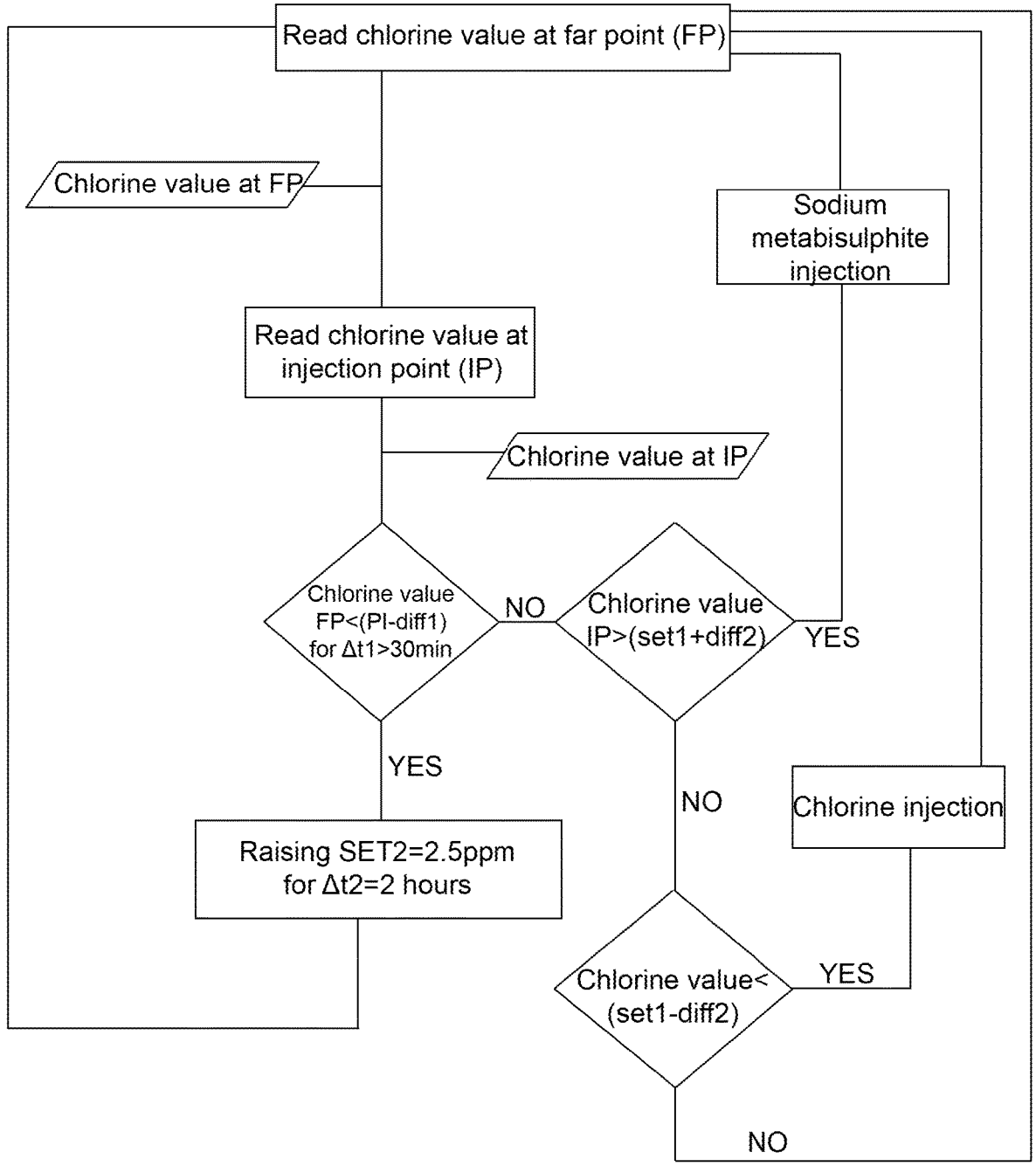
FIG. 4 shows the block diagram of the control of the water purification system in FIG. 3 according to the method of chlorinating drinking water according to the present invention.

FIG. 4 shows the block diagram of the control system of a production and distribution system of drinking water on board a ship according to the method of chlorinating drinking water according to a preferred implementation form of the invention. In the example, the chlorinating method comprises the injection of sodium metabisulphite to adjust the concentration of free chlorine at the injection point, both during the sub-steps a1) of regimen chlorination and during the steps e) of stabilization at the end of the transient hyper-chlorination sub-steps a2).

Figure 1:
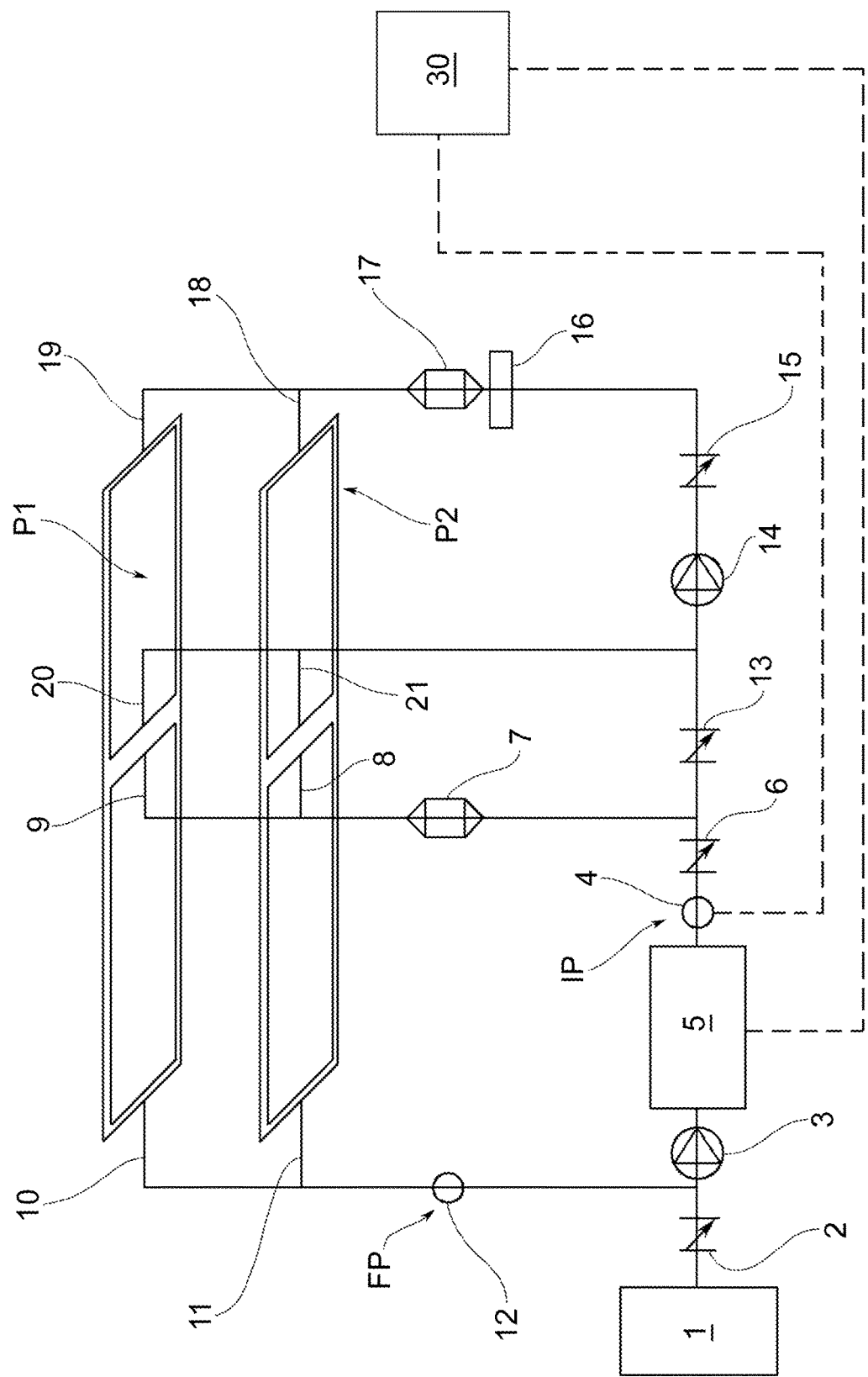
FIG. 1 shows a simplified functional scheme of a water purification system of a passenger ship according to the prior art.
Figure 2:
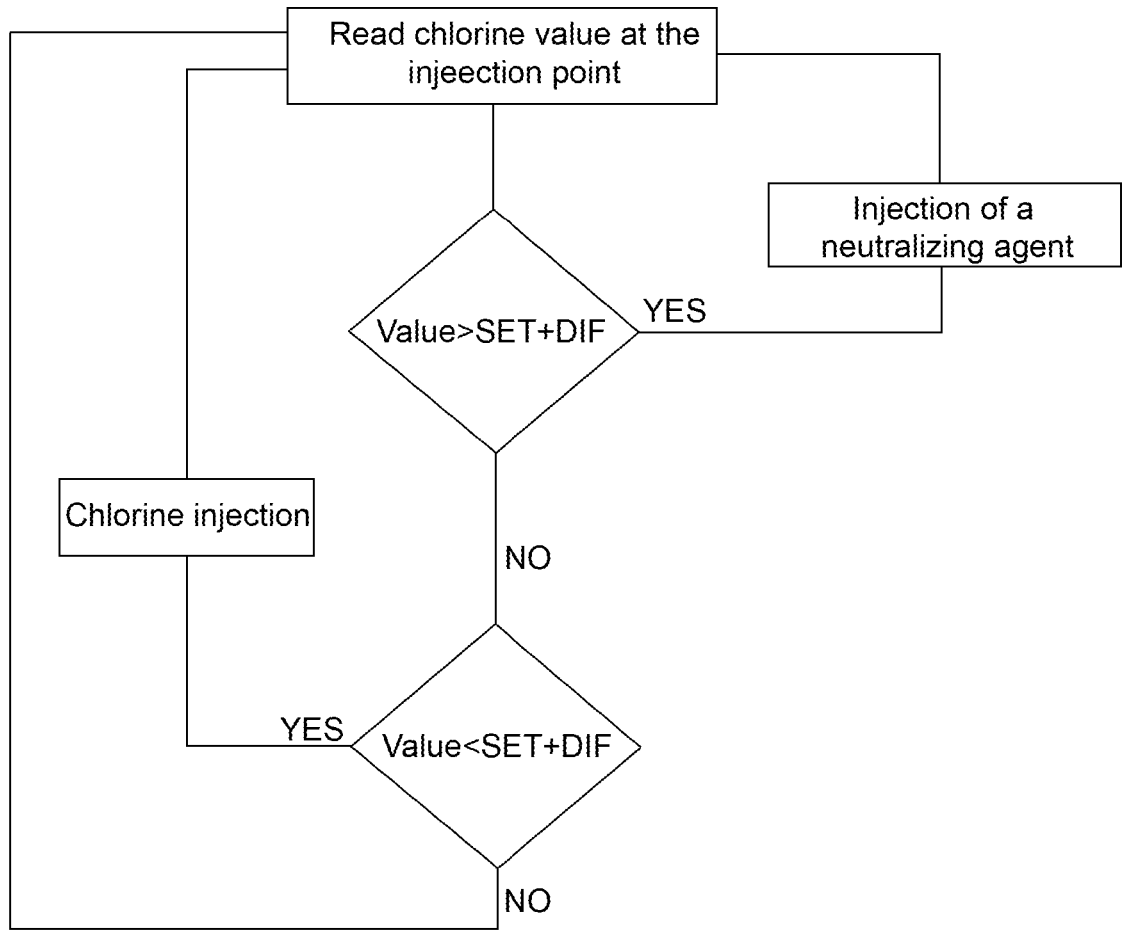
FIG. 2 shows the block diagram of the control of the water purification system in FIG. 1.

Preferably, as shown in the diagram in FIG. 2, the concentration value of free chlorine at the injection point is let to vary around the predetermined set point value SET1 within a fluctuation band (±diff2) providing for an injection of chlorine in the case of falling below the fluctuation band or a neutralizing agent in the event of an increase above such fluctuation band.

Operatively, for the injection a greatly diluted sodium hypochlorite mixture is preferably used which is injected into the water in volumes corresponding to the concentration of residual free chlorine to be obtained in the distribution network, as in the following table 1 which shows some values by way of example:

TABLE 1

| Residual free chlorine mg/l | Volumes in ml of solution titred to 5% by weight to be injected in 1 m³ of water to obtain the concentrations of residual free chlorine in mg/l | |
|---|---|---|
| | Diluted Mixture 1% | Diluted Mixture 5% |
| 0.2 | 20 | 4 |
| 0.5 | 50 | 10 |
| 1.0 | 100 | 20 |
| 1.5 | 150 | 30 |
| 2.0 | 200 | 40 |
| 3.0 | 300 | 60 |

The present invention also relates to a ship, particularly a passenger ship, comprising a production and distribution system of drinking water on board.

Such production and distribution system of drinking water on board a ship is suitable to implement the chlorinating method according to the invention, described above. What has been described above in relation to the chlorinating method thus applies directly also to the production and distribution system. For ease of description then reference will be made to the description already provided of the chlorinating method, avoiding as much as possible worthless repetition.

According to a general embodiment, the aforesaid production and distribution system of drinking water on board ship comprises:
- a recirculation distribution network;
- a device 5 for injecting at a predetermined injection point (IP) in the distribution network at least one chlorine compound capable of generating free chlorine in the water; and
- a first detection probe 4 of the free chlorine in the distribution network at or near the injection point IP.

In particular, the drinking water production and distribution system comprises drinking water storage tanks 1, fluidly connected to the recirculation distribution network via non-return valves 2. The recirculation distribution network is then supplied with drinking water taken from the drinking water storage tanks 1.

According to a first essential aspect of the invention, the production and distribution system of drinking water comprises:
- a second probe 40 for the continuous detection of free chlorine in circulation in the distribution network at the furthest point FP from the chlorine injection point IP; and
- an electronic control unit 50 programmed to act on the injection device to vary the concentration of free chlorine at the injection point IP as a function of the concentration values of free chlorine detected by the second probe 40 in the furthest point (Far point) FP from the chlorine injection point (IP.

In other words, the system according to the invention is designed to implement an automatic feedback control of the injection device 5 as a function of the concentration values of free chlorine detected by the second probe 40 at the Far point FP.

According to a further essential aspect of invention, as already described in terms of operating steps in relation to the chlorinating method, the aforesaid electronic control unit 50 is programmed to adjust the injection device so as to maintain the concentration of free chlorine in the distribution network at the injection point IP at a regimen set point SET1 comprised between 0.2 and 1.2 mg/l of free chlorine, if the following conditions are met:
the second probe 40 does not detect variations (specifically, drops) in the concentration of free chlorine at the far point FP with respect to the regimen set point SET1;
if the second probe 40 detects concentration variations (specifically, drops) with respect to said regimen setpoint SET1 having entity lower than a pre-determined safety limit Diff1 and/or duration lower than a predetermined safety limit time Δt1.

Preferably, resuming what was described in relation to the chlorinating method, the aforesaid regimen set point SET1 for the concentration of free chlorine at the injection point PI is chosen with a minimum value of 0.4 mg/l and not of 0.2 mg/l. In other words, preferably the aforesaid regimen set point SET1 is comprised between 0.4 and 1.2 mg/l. The choice of a minimum operating value of 0.4 mg/l instead of 0.2 mg/l is functional to providing a safety margin to the system in the event of contamination by biological material, with respect to the 0.2 mg/l limit imposed by regulation.

Preferably, to obtain the maximum advantage from the invention in terms of reduction of corrosive phenomena, the aforesaid regimen set point SET1 is chosen in the range comprised between 0.4 and 1 mg/l, and even more preferably in the range comprised between 0.4 and 0.8 mg/l. A most preferred value for the regimen set point SET1 is about 0.6 mg/l.

According to a preferred embodiment of the invention, the aforesaid electronic control unit 50 is programmed to adjust the injection device 5 so as to temporarily raise the concentration of free chlorine in the distribution network at the injection point IP to a predetermined hyper-chlorination set point SET2 corresponding to a concentration of free chlorine greater than 1.2 mg/l, if the second probe 40 detects variations (drops) in the concentration of free chlorine at the far point (FP) with respect to the regimen set point SET1.

Preferably, as already described in relation to the chlorinating method, the aforesaid electronic control unit 50 is programmed to cause a temporary raise of the concentration of free chlorine at the injection point IP to the predetermined hyper-chlorination set point SET2, if the second probe 40 detects variations (drops) in the concentration of free chlorine at the far point FP with respect to the regimen set point SET1 having entity higher than the aforesaid predetermined safety limit Diff1 and/or duration higher than the aforesaid predetermined safety limit time Δt1.

As already described above in relation to the chlorinating method, the electronic control unit 50 is preferably programmed to condition the raise of the concentration of free chlorine at the injection point (hyper-chlorination) to the detection of variations (drops) in concentration at the Far point having entity higher than the aforesaid predetermined safety limit Diff1 and/or duration higher than the aforesaid predetermined safety limit time Δt1 so as to make the system as independent as possible of false alarms and create a control which can be managed in an easy and reliable manner.

As noted above, the production and distribution system of drinking water on board a ship according to the invention differs from the prior technical solutions in that it comprises:
a second probe 40 for continuous detection of the free chlorine at the Far point FP; and
an electronic control unit 50 programmed to act on the injection device to vary the concentration of free chlorine at the injection point IP as a function of the concentration values of free chlorine detected by said second probe 40 at the Far point FP, according to the control logic described above (see also chlorinating method according to the invention).

Aside from these essential differences, the production and distribution system of drinking water on board a ship according to the invention may have a similar or identical structure to similar technical systems of the prior art.

According to the particular embodiment shown in FIG. 3, the production and distribution system of drinking water with a recirculation distribution network is preferably structured over two or more loop circuits connected in parallel, arranged on the various decks of the ship. FIG. 3 illustrates schematically two decks: the passenger deck P1 and service deck P2.

In particular, the system comprises a plurality of water storage tanks 1, structurally separated from the double bottom of the ship and from contaminant spaces. The system may be fed by an evaporator-distiller system and/or a reverse osmosis-distiller system and/or a bunkering system (not shown in the Figures).

The system comprises water treatment devices 5, in particular filtration and chlorination devices.

For the purposes of the present invention as already said, it is essential for the system to comprise a device 5 for injecting at a predetermined injection point (IP) in the distribution network at least one chlorine compound capable of generating free chlorine in the water.

The distribution network is made up of:
main manifolds, generally but not necessarily made of stainless steel, which form the distribution circuit and constitute the distribution loops on the decks of the ship; and
secondary manifolds, made of plastic, stainless steel or other suitable material which distribute the water from the main manifolds towards passenger users in the cabin and the users of restaurants and public areas.

Advantageously, the distribution network is equipped with: —withdrawing/boost/recirculation pumps 3, 14; heaters and coolers 7, 16, 17;—control valves/non-return valves 2, 6, 13, 15.

Preferably, the distribution network is divided into a cold drinking water circuit (reference numerals 1 to 13) and a hot drinking water circuit (reference numerals 14 to 21).

In particular, reference numerals 1 to 9 identify the branch of the network constituted by the main manifold bringing water from the drinking water storage tanks 1 toward the loops on decks P1 supplying passengers and toward the loops on decks P2 supplying service users, restaurants and public areas; reference numerals 10, 11 40 indicate the recirculation manifolds of cold drinking water from the decks; reference numerals 13, 18 and 19 identify the supply manifolds of hot drinking water; 20 and 21 indicate the recirculation manifolds of hot drinking water from the decks.

The system is equipped with:
- a first detection probe 4 of the free chlorine in the distribution network at or near the injection point IP; and
- a second probe 40 for continuous detection of the free chlorine at the Far point FP.

The two probes 4 and 40 are connected via data transmission lines 41 and 42 to an electronic control unit 50, preferably arranged in a control room 30. In turn the electronic control unit 50 is connected to the injection device 5 by a third data transmission line 43 to control said device 5.

Advantageously, the first probe 4 can be incorporated into the same injection device 5. In this case the probe can be placed immediately upstream of the injection point and functionally attached to a flow meter. The amount of chlorine compound to be injected is calculated on the basis of the current value of the residual concentration of free chlorine and instantaneous water flow.

Alternatively, the first probe 4 can be placed immediately downstream of the injection device 5, in addition to or as an alternative to the probe of said injection device.

Advantageously, the injection device 5 may be equipped with an injection apparatus of a neutralizing substance, for example, sodium metabisulphite (E223).

Advantageously, the production and distribution system of drinking water may comprise:
- at least two first probes 4, both placed at or near the injection point (IP); and
- at least two second probes 40, both placed at the Far point (FP).

The arrangement of two probes 4 or 40 at the injection point and at the far point makes it possible to implement a check of the detected concentration values. Operatively, a possible difference in reading between the two probes at IP or FP will highlight an anomaly and/or detection failure of one of the two probes, thereby enabling intervention.

The invention makes it possible to achieve numerous advantages some of which already described.

The method of chlorinating drinking water on a ship, in particular a passenger ship, according to the invention makes it possible to eliminate or at least reduce the incidence of corrosion phenomena in the distribution network, while continuing to ensure the asepticity of the network.

The free chlorine values envisaged by the present invention in regimen chlorination conditions (from 0.4 to 1.2 mg/l, and preferably from 0.4 to 0.8 mg/l) are in fact able to offer at the same time low levels of consumption of the chlorine compound, adequate levels of protection from pathogenic microorganisms, reduced ageing of the materials of the circuit and the absence of corrosion of the stainless steel.

The adoption of such "low levels of chlorination" makes the control system independent of the consumption of chlorine related to corrosion phenomena on the distribution network. As a result, a decrease in concentration at the far point is more easily correlated to the presence of biological material in the distribution network and can therefore be taken as a condition for triggering a temporary increase of the chlorination level aimed at making the network safe. This makes it possible to implement a feedback control system depending on the concentration of free chlorine detected at the Far point.

Advantageously, the method of chlorinating drinking water on a ship according to the invention is therefore easy to implement and can be managed in a completely automated manner. This relieves the crew of subjective assessments on the drop in free chlorine and the level needed for its maintenance.

The chlorination method of drinking water according to the invention can therefore be implemented without requiring a complex automatic control system, since compared to the prior methods it requires only the installation of a detection probe at the Far point and an appropriately programmed electronic control unit.

In the case of contamination of the water, the system is able to react ensuring safety margins with respect to the limits imposed by regulation. The transient hyper-chlorination provided for by the method according to the invention (possibly repeatable in several steps) is in fact suitable to simultaneously ensure both desired conditions: the destruction of bacterial flora and preservation of the stainless steel. The chlorinating method according to the invention is structured so that such hyper-chlorination is carried out substantially only when necessary, i.e. in the case of actual contamination of the circuit, so as not to unnecessarily increase the risk of corrosion.

The adoption of such "low levels of chlorination" also has the advantage of being protective for human health. Regarding this last aspect in fact, it should be recalled that, over the years, there has been growing awareness that hypochlorites added to water for disinfection purposes seem to have adverse effects on human health. The field of hypochlorite by-products, some of which fall within the Total Residual Chlorine (TRC) parameter, is subject to monitoring and often restricted by international standards.

The production and distribution system of drinking water on board a ship according to the invention allows, lastly, automatic control of the chlorination of water according to a logic of reducing the incidence of corrosive phenomena and at the same time of maintaining the aseptic conditions of the distribution network.

The invention thus conceived thereby achieves the purposes set out.

Obviously, its practical embodiments may assume forms and configurations different from those described while remaining within the sphere of protection of the invention.

Moreover, all the details can be replaced by technically equivalent elements and the dimensions, forms and materials used may be any as needed.

The invention claimed is:

1. Method of chlorinating drinking water on a ship, the ship is equipped with a drinking water production and distribution system comprising a recirculation distribution network and a device for injecting at a predetermined injection point into the distribution network at least one chlorine compound capable of generating free chlorine in water, said chlorinating method comprising:
   a step a) of chlorination, in which said at least one chlorine compound is injected into circulation at the predetermined injection point in order to keep the distribution network aseptic, and comprising the following operative steps:
   a step b) of fixing a regimen set point for concentration of free chlorine at the injection point between 0.4 mg/l and 1.2 mg/l;
   a step c) of monitoring the concentration of free chlorine proximate the injection point by at least a first detection probe positioned therein;
   a step d) of continuously monitoring the concentration of free chlorine at a furthest point of the distribution network from the injection point by at least a second detection probe positioned therein; and wherein the injection step a) comprises a sub-step a1) of regimen chlorination in which the injection of the at least one chlorine compound in the distribution network is conducted so as to maintain the concentration of free chlorine in the distribution network at the injection point at said regimen set point, said regimen chlorination sub-step a1) being performed if the second probe does not detect variations in the concentration of free chlorine at a furthest point with respect to the regimen set point or if the second probe detects variations in the concentration of free chlorine at the furthest point with respect to said regimen set point having an amplitude lower than a predetermined safety limit of variation and/or if a duration of the variations in the concentration of free chlorine at the furthest point detected by the second probe is lower than a predetermined safety time limit, drops in the concentration of free chlorine in the furthest point with respect to the regimen set point being directly attributable to presence of biological material in said distribution network and being usable to trigger temporarily raising a level of chlorination at the injection point with respect to said regimen set point.

2. Method of chlorinating according to claim 1, wherein said regimen set point for the concentration of free chlorine at the injection point is comprised between 0.4 mg/l and 1.0 mg/l.

3. Method of chlorinating according to claim 1, wherein said predetermined safety limit of variation of the concentration value at the furthest point is not greater than 0.2 mg/l.

4. Method of chlorinating according to claim 1, wherein said predetermined safety time limit of the variation of the concentration value at the furthest point is chosen in the range between 30 minutes and 2 hours.

5. Method of chlorinating according to claim 1, wherein the injection step a) comprises a sub-step a2) of transient hyper-chlorination in which the injection of the at least one chlorine compound in the distribution network is conducted so as to temporarily raise the concentration of free chlorine in distribution network at the injection point to a predetermined hyper-chlorination set point corresponding to a concentration of free chlorine greater than 1.2 mg/l, said sub-step a2) of transient hyper-chlorination being performed if the second probe detects variations in concentration of free chlorine in the furthest point with respect to the regimen set point higher than said predetermined safety limit of variation and/or the duration of the variations in the concentration of free chlorine at the furthest point detected by the second probe is higher than said predetermined safety time limit.

6. Method of chlorinating according to claim 5, wherein said hyper-chlorination set point is fixed at a concentration value of free chlorine not greater than 5.0 mg/l.

7. Method of chlorinating according to claim 5, wherein said sub-step a2) of transient hyper-chlorination is continued for a predetermined time period of transient hyper-chlorination.

8. Method of chlorinating according to claim 7, wherein said time period of transient hyper-chlorination is set depending on extension of the distribution network.

9. Method of chlorinating according to claim 7, wherein said time period of transient hyper-chlorination has a duration chosen in the range between 2 and 12 hours.

10. Method of chlorinating according to claim 5, wherein, at the end of said sub-step a2) of transient hyper-chlorination, the method comprises a step e) of stabilization of the concentration of free chlorine in which the concentration of free chlorine at the injection point is made to decrease from the hyper-chlorination set point up to reach the regimen set point, at the end of said stabilization step e) the sub-step a1) of regimen chlorination or the sub-step a2) of transient hyper-chlorination being repeated again, depending on whether at the furthest point a concentration of free chlorine substantially corresponding to the regimen set point is detected.

11. Method of chlorinating according to claim 10, wherein in said stabilization step e) the injection of the at least one chlorine compound stops and a reducing substance is injected to neutralize the free chlorine to accelerate reaching of the regimen set point or the concentration of free chlorine is allowed to fall until the regimen set point is reached without any intervention.

12. Method of chlorinating according to claim 1, wherein the method is conducted automatically by an electronic control unit.

13. A ship, comprising a production and distribution system of drinking water, comprising:
   a recirculation distribution network;
   a device for injecting at a predetermined injection point in the distribution network at least one chlorine compound capable of generating free chlorine in the water;
   at least a first detection probe of the free chlorine in the distribution network proximate the injection point;
   at least a second probe for continuous detection of free chlorine in circulation in the distribution network at a furthest point from the chlorine injection point; and
   an electronic control unit programmed to act on the injection device to vary the concentration of free chlorine at the injection point as a function of concentration values of free chlorine detected by the second probe in the furthest point from the chlorine injection point,
   said electronic control unit being programmed to adjust the injection device so as to maintain the concentration of free chlorine in the distribution network at the injection point at a regimen set point comprised between 0.4 and 1.2 mg/l of free chlorine, if the second probe does not detect variations in the concentration of free chlorine at the furthest point with respect to the regimen set point or if the second probe detects variations in the concentration of chlorine at the furthest point with respect to the regimen set point having an amplitude lower than a predetermined safety limit and/or if a duration of the variations in the concentration of free chlorine at the furthest point detected by the second probe is lower than a predetermined safety time limit.

14. A ship according to claim 13, wherein said electronic control unit is programmed to adjust the injection device to temporarily raise the concentration of free chlorine in the distribution network at the injection point to a predetermined hyper-chlorination set point corresponding to a concentration of free chlorine greater than 1.2 mg/l, if the second probe detects variations in concentration of free chlorine at the furthest point with respect to the regimen set point, if the variations in concentration are higher than said predetermined safety limit and/or a duration higher than said predetermined safety time limit.

15. A ship according to claim 13, wherein said regimen set point for the concentration of free chlorine at the injection point is between 0.4 and 1 mg/l.

16. Method of chlorinating according to claim 1, wherein said regimen set point for the concentration of free chlorine at the injection point is comprised between 0.4 mg/l and 0.8 mg/l.

17. Method of chlorinating according to claim 1, wherein said predetermined safety limit of variation of the concentration value at the furthest point is equal to about 0.1 mg/l.

18. Method of chlorinating according to claim 1, wherein said predetermined safety time limit of the variation of the concentration value at the furthest point is chosen in the range between 30 minutes and 1 hour.

19. Method of chlorinating according to claim 5, wherein said hyper-chlorination set point is fixed at a concentration value of free chlorine between 2.0 mg/l and 3.0 mg/l.

20. Method of chlorinating according to claim 5, wherein said hyper-chlorination set point is fixed at a concentration value of free chlorine equal to about 2.5 mg/l.

21. Method of chlorinating according to claim 7, wherein said time period of transient hyper-chlorination has a duration chosen in the range between 2 hours and 6 hours.

22. A ship according to claim 13, wherein said regimen set point for the concentration of free chlorine at the injection point is between 0.4 mg/l and 0.8 mg/l.

\* \* \* \* \*